No. 723,932. PATENTED MAR. 31, 1903.
P. H. SHUE.
CENTRIFUGAL ORE CONCENTRATOR.
APPLICATION FILED MAR. 24, 1902.
NO MODEL. 4 SHEETS—SHEET 2.
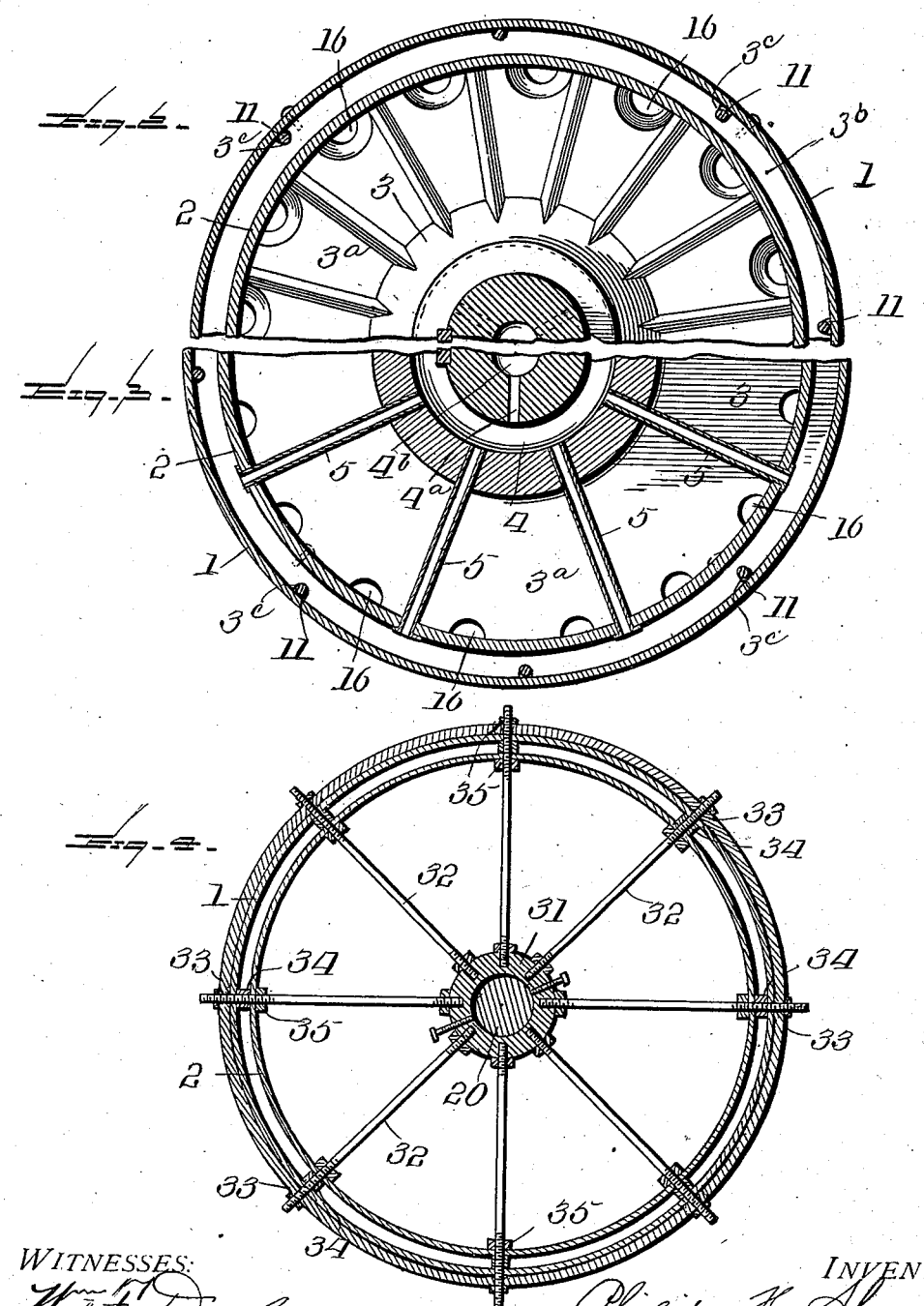

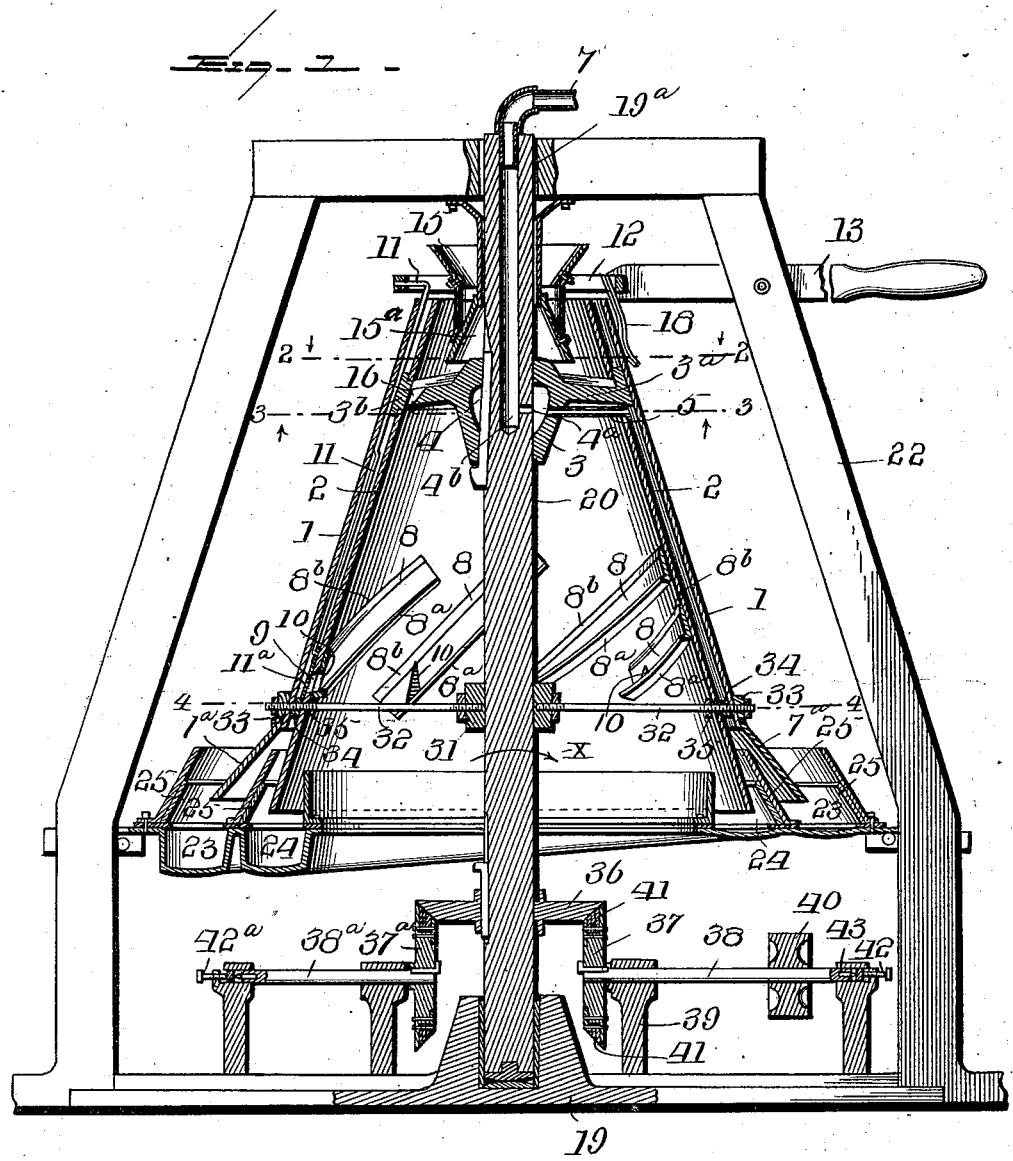

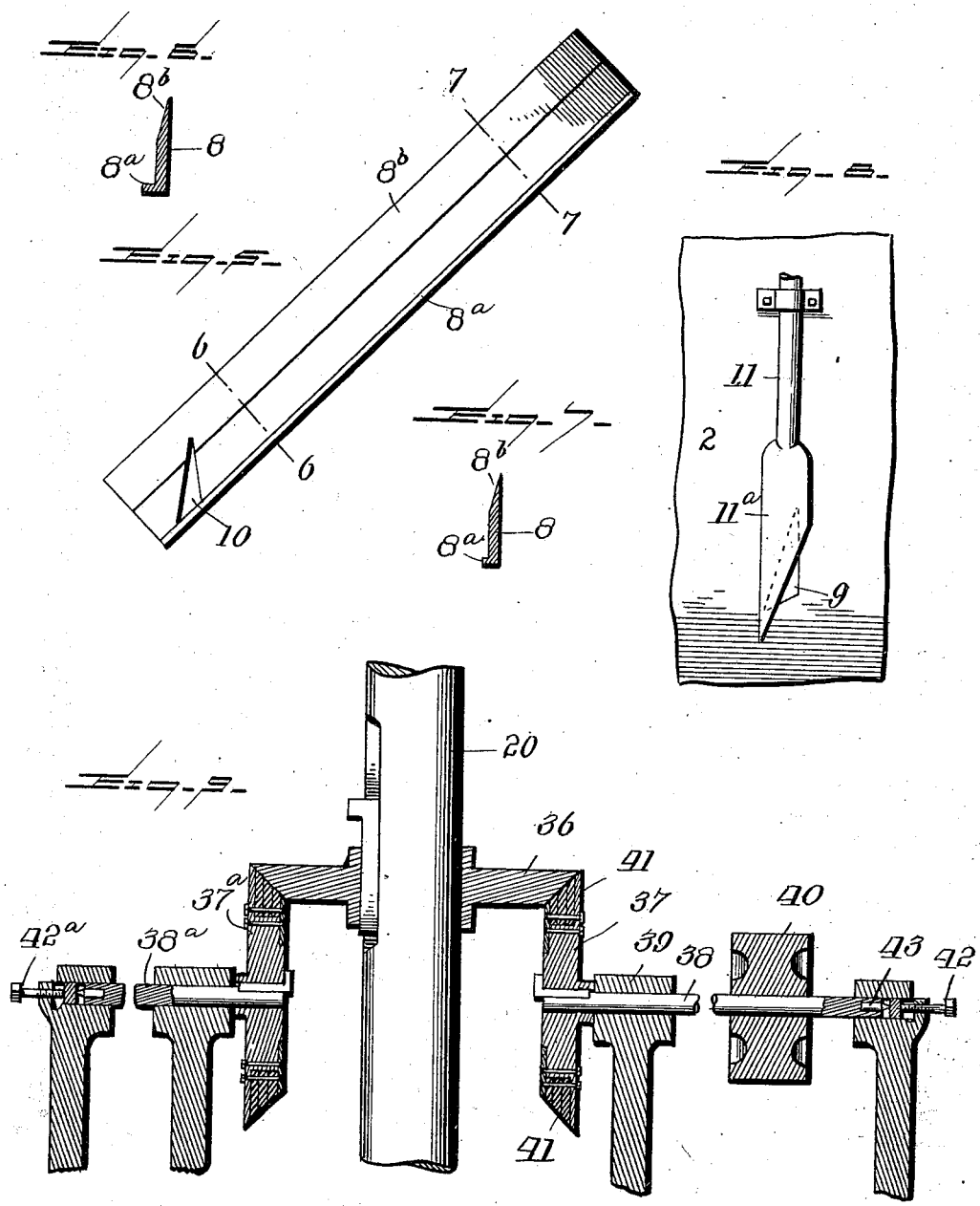

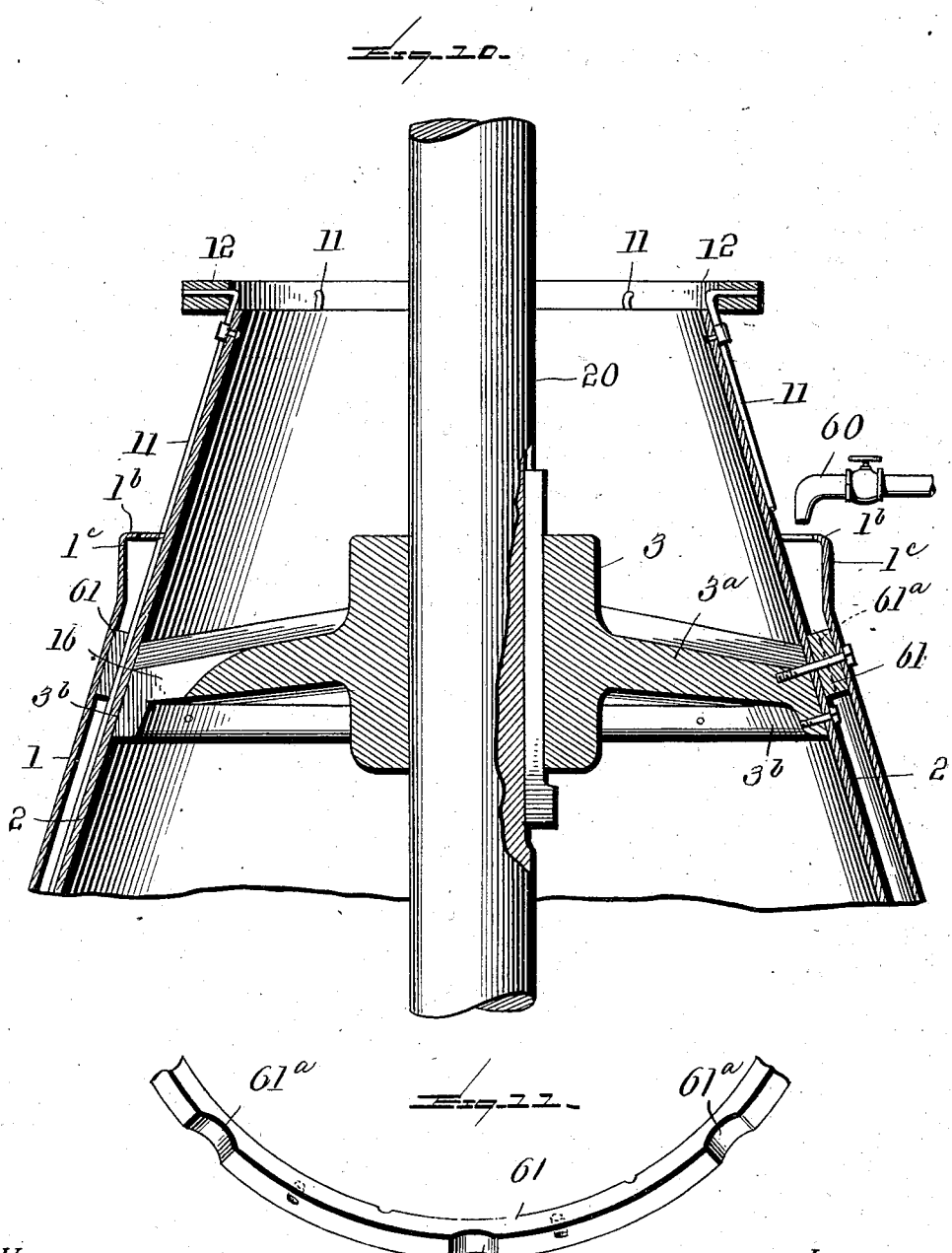

UNITED STATES PATENT OFFICE.

PHILIP H. SHUE, OF OURAY, COLORADO.

CENTRIFUGAL ORE-CONCENTRATOR.

SPECIFICATION forming part of Letters Patent No. 723,932, dated March 31, 1903.

Application filed March 24, 1902. Serial No. 99,694. (No model.)

*To all whom it may concern:*

Be it known that I, PHILIP H. SHUE, a citizen of the United States, residing at Ouray, in the county of Ouray and State of Colorado, have invented certain new and useful Improvements in Centrifugal Ore-Concentrators; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to ore-concentrators, and particularly to centrifugal concentrators and separators in which the "pulp" or ore to be treated is fed in a fluid or semifluid state into a rotating conical vessel which stratifies the pulp according to the specific gravity of its ingredients, so that the metals may be to a large extent separated by escaping through openings in the wall of the vessel.

The invention is particularly an improvement on the machines shown and described in my United States Letters Patent No. 648,088, dated April 24, 1900, and No. 681,271, dated August 27, 1901.

The objects and particular points of improvement in the present machine relate to the construction of the vessel, the wash-water supply and flow, the pulp-feeding means, the separating device and discharge-openings, and means to adjust the size of said openings.

In the former inventions above referred to the vessel was composed of a single conical casing having a solid bottom and carrying separating and discharge tubes embedded in the sides. In the machine herein shown the vessel is composed of two separated casings having no bottom. The inner casing carries an improved separating device, and the wash-water, formerly a source of much trouble, is fed into the space between the casings, and thus flows freely out of contact with the pulp, acting only on the concentrate after its separation. The adjusting-valves for the openings which separate and discharge the concentrate are located between the casings and are operated simultaneously by rods which extend between and above the casings, where they are connected to a shifting ring. By having the bottom open the ready removal or repair of the separating devices is permitted.

The invention further comprises improved driving means connected to the spindle or shaft below the vessel, so that the power is applied nearer the center of weight and also so that the velocity at which the machine is driven may be readily adjusted to suit the nature of the material without interruption of operation. The balanced friction driving-gear is particularly suited to the machine.

An embodiment of the invention is illustrated in the accompanying drawings, in which—

Figure 1 is a longitudinal vertical section showing parts in elevation. Fig. 2 is a fragmentary section on the line 2 2 of Fig. 1. Fig. 3 is a fragmentary section on the line 3 3 of Fig. 1. Fig. 4 is a section, reduced, on the line 4 4 of Fig. 1. Fig. 5 is an elevation of a portion of the inner casing, showing one of the separating-plates. Fig. 6 is a section on the line 6 6 of Fig. 5. Fig. 7 is a section on the line 7 7 of Fig. 5. Fig. 8 is an elevation of a portion of the outside of the inner casing, showing the valve for the discharge-opening. Fig. 9 is a sectional view showing the friction driving-gear for the machine. Fig. 10 is a fragmentary section showing a modified form of the mounting of the casings on the shaft. Fig. 11 is a perspective of a portion of the spacing-ring used in the modified form.

Referring specifically to the drawings, the separating vessel comprises an outer casing 1 and an inner casing 2. These casings are frusto-conical in shape and are spaced apart a suitable distance, preferably about three-eighths or one-half an inch. The bottom of the outer casing has a flared extension (indicated at 1$^a$) to carry the concentrate to its receiving-pan. The hub, to which the casings are bolted, is indicated at 3 keyed to the main spindle or shaft 20, which is journaled at the bottom in a step-box 19 and at the top in suitable boxes 19$^a$, supported by the frame 22 of the machine. The hub contains an annular water-chamber 4, communicating by the passages 4$^a$ with the bore 4$^b$ of the main shaft, through which the wash-water is introduced from the pipe 7, which enters the bore at the top of the shaft. The chamber in the hub also communicates by a series of radial pipes 5 with the space between the casings. When the machine is in operation, the wash-water flows down between the casings and acts upon the concentrate which is discharged through the openings 9. Adjacent each of these openings is a separating-plate 8, which is attached in any proper manner to the inner face of the inner casing. This plate has a projecting flange $8^a$ and extends upwardly in an inclined direction across the line of flow of the pulp produced by its gravitation and the rotation of the casings, the direction of rotation being indicated by the arrow $x$. The plate is beveled at its front edge, as at $8^b$, to take under the pulp, and the flange $8^a$ tapers from the bottom to the top, as indicated in Figs. 6 and 7, so as to separate a gradually-increasing slice or stratum from the pulp. The heavier particles of the pulp are massed against this flange and pass down along the same to the openings 10, through which the heavier stratum is discharged against the outer casing 1. The size of the openings, and consequently the amount of concentrate separated, is controlled by valves $11^a$, which are attached to and operated by valve-rods 11, which extend upwardly between the casings and are secured at their upper ends to a ring 12, which may be shifted by lever 13, pivoted to the frame of the machine. Springs 28, which are attached to the ring and bear against the outside of the casing, serve to yieldingly retain the ring in position at which it may be adjusted.

The pulp or ore to be treated is fed into the top of the separator through a hopper 15, which is stationary, being attached to the frame of the machine. From the hopper the material drops upon a spreader $15^a$ and thence upon the web $3^a$ of the hub. It is there given positive rotary motion and flows, through the openings 16, down the inside of the inner casing. The periphery of the hub is flanged, as at $3^b$, to permit the attachment thereto of the casings by bolts or otherwise and to properly space the casings apart at the top thereof. It is also grooved, as at $3^c$, (see Figs. 2 and 3,) to permit the passage of the valve-rods.

The spider to support the lower end of the casings consists of a collar 31 upon the main shaft, bored to receive the threaded ends of radial connecting-rods 32, which extend through the casings and through a rim 33. On the rods, between the casings, are spacing-sleeves 34, which serve to retain the casings the proper distance apart. Binding-nuts 35 serve to hold the parts together.

The receiving-pans are indicated at 23 for the concentrate and 24 for the tailings and are not substantially different from the pans described in my former patents, except that they are provided with felt shields 25, against which the material is discharged to prevent the wear of the metal parts.

The driving-gear consists of a plain bevel-wheel 36, keyed to the shaft or spindle 20, engaged by a friction drive-wheel 37, mounted on a shaft 38, which is supported in bearings in standards 39 upon the frame of the machine. The shaft is provided with a drive-pulley 40, and the friction-wheel is faced with felt 41. The drive-shaft is longitudinally adjustable in its bearings by means of a screw 42, against which the hardened center 43 of the shaft abuts. By means of the screw the friction-pressure of the drive-wheel against the bevel-wheel on the main shaft may be increased or diminished, whereby the velocity of the shaft may be regulated. Diametrically opposite the driving-shaft is an idler-shaft $38^a$, carrying a friction-wheel $37^a$, engaging the bevel-wheel on the main shaft. The idler is capable of an adjustment, by means of the screw $42^a$, similar to that of the drive-shaft above described. The purpose of the idler is to balance the gear and equalize the action.

The drive-gear and its adjustment are particularly suitable for the machine, because the gears can be adjusted to drive the machine at any desired speed and give a steady motion without vibration and at the same time avoiding carrying any weight on the drive-gear bearings. The gear is connected to the shaft below the casings near to the step-bearing, which tends to relieve strain on the upper bearing and the frame of the machine.

By means of the construction above described a thoroughly practical and efficient machine is formed. The shape of the separating-plates is such that the concentrate is collected in a dense mass and forced to pass over the discharge-openings, and only the higher gravities are permitted to pass through. The pulp receives the motion of the separator positively only when it is passing over and through the hub. It then flows on the inside of the inner casing, and by reason of its angular motion and the location of the separating-plates across its line of motion it is compelled in its outward and downward flow to pass over the plates and openings, through which latter the concentrate is allowed to pass and having so passed is washed by the water which flows down between the casings. The tailings continue to flow down the inside of the inner casing and are discharged at the lower end thereof.

In the modified form shown in Figs. 10 and 11 the wash-water is introduced directly between the casings instead of through the hub. In this construction the inner casing extends above the outer casing and the latter is spread slightly at the top, as at $1^c$. Water flows directly into the casing, as from a nozzle 60. An inturned lip-flange $1^b$ serves to prevent overflow or slop. The inner and outer casings are separated by a spacing-ring 61, which is provided with suitable openings for the passage of the valve-rods 11 and also with openings $61^a$, through which the wash-water flows down between the casings. This modified form permits two or more concentrators to be mounted on the same shaft.

What I claim is—

1. In a centrifugal ore-separator, in combination, inner and outer rotatable casings spaced apart with a free passage between them and at the discharge end, the inner casing having separating-openings, an ore-feed into the inner casing, and a wash-water feed into the space between the casings.

2. In a centrifugal ore-separator, a separating vessel having double walls each open at one end for ore and water feeds and at the other end for discharges, the water-feed being into the space between the walls, and the inner wall having separating-openings therein.

3. In a centrifugal ore-separator, a rotatable separator-casing having feed-guides projecting from the inner face thereof and extending across the line of flow of the material and separating-openings at the end of each guide.

4. In a centrifugal ore-separator, a rotatable separator-casing having separating-flanges projecting from the inner face thereof across the line of flow and valved discharge-openings at the lower end of each flange.

5. In a centrifugal ore-separator, a rotatable separator-casing having a plurality of separating-flanges projecting from the inner face of the casing entirely across the line of flow of the material and discharge-openings at the lower end and base of each flange across the line of flow thereby.

6. In a centrifugal ore-separator, the combination with a rotatable substantially conical separator-casing having discharge-openings therein, of detachable plates secured to the casing having tapering projecting flanges extending from the openings upwardly and inclined across the line of flow of the material.

7. In a centrifugal ore-separator, the combination with a rotary substantially conical separating-casing having double spaced walls and discharge-openings in the inner wall, of means to vary the size of the openings comprising valves slidable in the space between the casings over the openings, an adjusting-ring rotatable with the casing and adjustable thereon, rods connecting the ring and the valves, and a shifting-lever for the ring.

8. In a centrifugal ore-separator, in combination, a shaft or spindle having a water-supply passage therein at its upper end, a hub on the shaft having an interior annular chamber communicating with the water-passage, spaced separating-casings carried by the hub, having a free passage between them and at the discharge end, and water-supply pipes leading from the chamber to the space between the casings.

9. In a centrifugal ore-separator, the combination with a spindle and spaced substantially conical separator-casings carried thereby, having a free passage therebetween and at the discharge end, of a hub between the shaft and casings having ore-feed openings adjacent the inner casing, and an annular water-chamber, means to supply said chamber with water, and pipes extending from said chamber to the space between the casings.

10. In a centrifugal ore-separator, in combination, a spindle, a hub thereon, substantially conical inner and outer casings secured thereto, a collar on the spindle below the hub, tie-rods connecting the collar and the casings, and spacing-sleeves on the rods between the casings.

In testimony whereof I affix my signature in presence of two witnesses.

PHILIP H. SHUE.

Witnesses:
MAURICE CORBETT,
T. W. EMERSON.